UNITED STATES PATENT OFFICE.

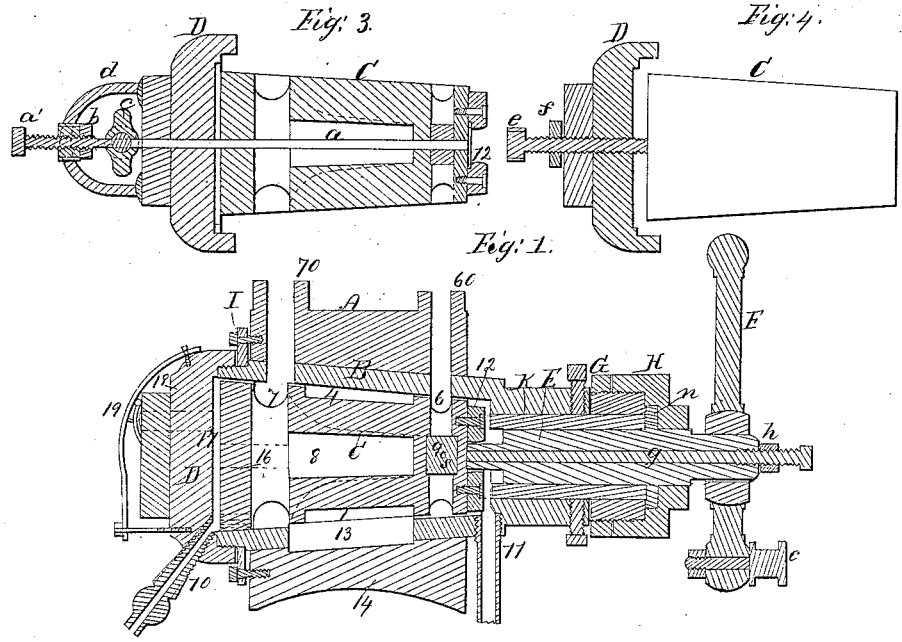

SIDNEY MALTBY, OF DAYTON, AND BARTON PICKERING, OF MILTON, OHIO.

IMPROVEMENT IN BALANCED PLUG-VALVES.

Specification forming part of Letters Patent No. 51,329, dated December 5, 1865.

*To all whom it may concern:*

Be it known that we, SIDNEY MALTBY, of Dayton, in the county of Montgomery and State of Ohio, and BARTON PICKERING, of Milton, in the county of Miami and State aforesaid, have invented a new and Improved Mode of Constructing Steam-Engines; and we do hereby declare that the following is a full and exact description thereof, reference being had to the accompanying drawings and the letters of reference marked thereon.

The same letters and numerals used on the different figures refer to like parts.

The nature of our invention consists in an improved balance plug-valve for either double or single cylinder steam-engines, and several improvements in connection therewith.

Figure 1 represents a sectional view of the several parts on a line with the axis of the valve, except the valve, which is shown in perspective. Fig. 2 represents a sectional view at a right angle with the axis of the valve, embracing a section of the cylinders and the several ports. Fig. 3 represents an adjustable rod in connection with the cap and valve. Fig. 4 represents an adjustable rod in connection with the cap and valve.

To enable others skilled in the art to make and use our invention, we will proceed to describe its construction and operation.

A, Fig. 1, represents that part of the engine containing the bush and a section of the ports and openings leading to and from the valve, the nipple 6°, to which the supply-pipe is attached, and the nipple 7°, to which the exhaust-pipe is attached.

B represents a bush or casing, forming the seat of the valve C, having orifices 1, 2, 4, and 5, (shown at Fig. 2,) and a square orifice for the induction of steam, corresponding in form with the face 9 of the valve, Fig. 1, and an orifice (shown at 15) through which the exhaust-steam passes; also, orifices 10 and 11 at either end of the valve, through which to carry off the water which may accumulate in these spaces, either with pipes or stop-cocks. The small end of the bush has a round orifice, with spaces provided to receive the adjusting-pads K, which form a bearing for the rock-shaft E.

One of the principal advantages in the use of a bush for a plug-valve is in making and repairing the valve-seat.

The adjusting-pads may be dispensed with, and a tapering bush used instead, having a corresponding taper with the shaft.

C represents the plug-valve, having orifices 1 and 2 and the orifices 3 and 4, communicating through the valve, as shown at Fig. 2; also, the exhaust-port 5, extending into and around the valve, as shown at Fig. 1, the dotted lines showing the cavity 8 extending into the cavity 7, which extends around the valve. The orifices 1 and 4 open on each side of the valve into the cavities 6, which extend on each side a sufficient distance to balance the pressure on the valve. In the large end of the valve C are small orifices, (shown by dotted lines,) for the passage of the water accumulating within the cavity 7 of the valve. To the end of the valve is securely attached the piece 12, made of hardened metal. This piece has a square orifice slightly rounded, into which is inserted the square end of the rock-shaft E, and by which arrangement the valve is moved without its having any inclination from its axis of motion.

E represents a rock-shaft having a collar, *n*, by which it is held against the end of the bush to stay it in position by the use of the cap-nut H and the lock-nut G, which are screwed onto the bush, as shown at Fig. 1. The rock-shaft has an orifice through it for the adjusting-rod *g*. This rod is screwed into the shaft, as shown, and when adjusted against the end of the valve is fastened by the lock-nut *h*. This arrangement prevents the valve being forced into its seat, producing an excess of friction.

To the outer end of the shaft is attached the usual rock-arm, F.

J represents a collar which rests against a shoulder on the bush, which collar is firmly bolted to the engine and holds the bush in position.

D represents the cap, as shown at Fig. 1, screwed onto the bush, or it may be bolted on, and one of its uses is to form a chamber for the exhaust-steam to act on the valve.

The metallic adjusting-rod *a*, Fig. 3, passes through an orifice in the center of the valve C, and is firmly attached to the small end of the valve. The opposite end, passing through the cap D, is connected outside with the adjusting-rod *a'* by a ball or socket-joint, or its equivalent. The rod *a'* is screwed into the bale *d* and is fastened securely by the lock-nut *b*. The use is to hold the valve in position, and is adjusted when the engine is heated up, and as the engine cools the contraction of the rod will slightly withdraw the valve from its seat, and on again being heated up the valve is carrried back to its proper position by the expansion of the rod, thus avoiding injury to the valve by the contraction of its seat.

In Fig. 4, letter $e$ represents an adjusting-rod screwed into the cap D, having a bearing against the valve C to stay it in position. The lock-nut $f$ holds the rod securely in position when adjusted.

In Fig. 2 is represented the valve C, with its cavities 1, 2, 3, 4, and 5, the corresponding orifices of the bush $1^\circ$, $2^\circ$, $4^\circ$, and $5^\circ$, corresponding with the parts $o\ o\ o\ o$ connecting with the several ends of the cylinders.

Operation: The steam passing in through the orifice $6^\circ$, Fig. 1, to the cavity 6 of the valve, thence to the opening 4 into the opening of the bush $4^\circ$, thence to the end of the small cylinder, the valve being shifted, 4 takes the place of 1. The steam is then received on the opposite side of face 9, Fig. 1, of the valve. The steam then passes through 2 1 $2^\circ$ to the opposite end of the small cylinder. The exhaust steam passes from the small cylinder through 3 4 $5^\circ$ to the farther end of the large cylinder. The valve being again changed to the first position the inner end of the small cylinder exhausts its steam into the inner end of the large cylinder, the farther end of the large cylinder exhausting through 5 $5^\circ$ to the cavities 8 and 7 of the valve, out through the orifice $7^\circ$ to the open air.

To use the valve C for a single-cylinder engine, it is only necessary to dispense with the openings $1^\circ$ and $2^\circ$ in the bush B. The operation is very apparent by supposing the division-head of the double engine, see Fig. 2, removed and $4^\circ$ and $5^\circ$ communicating with opposite ends of a single cylinder.

The number 17 represents a valve closing the opening 16 through the valve C, through which the exhaust-steam passes into the chamber to hold the valve in its seat, and when the exhaust is complete holds the steam between the valve and the cap D; otherwise, when the exhaust is complete, the valve would be entirely relieved from pressure.

An orifice, 18, through the cap D, is provided for the escape of the steam when the pressure is in excess of that which is necessary to retain the valve C in position. This orifice is closed by a valve, 19, or its equivalent, having a spring to hold the valve against its seat, as shown at Fig. 1. The spring of the valve is adjusted by a set-screw, and adapted in power to the required pressure of the steam upon the valve C.

The different modes of adjustment of the valve C (shown at Figs. 1 and 3) are complete; but that of Fig. 4 requires the adjusting-rod $g$, Fig. 1, to make it complete. On the opposite side of the face 9 of the valve C is a cavity having an orifice, $s$, passing through the valve, for the purpose of equalizing the pressure on the sides of the valve.

What we claim as our invention, and desire to secure by Letters Patent, is—

1. The valve C, with the attached piece 12, the orifices 1, 2, 3, and 4, the port 5, Fig. 2, cavity 6, cavity opposite of face 9, orifice $s$, opening 16, and face 9, constructed substantially as described, and arranged with reference to the bush B and its opening, for the purposes set forth.

2. The bush or casing B, constructed and arranged substantially as described, and for the purposes specified.

3. The rock-shaft E, constructed and arranged substantially as described, and for the purposes set forth.

4. The cap D, having an orifice, 18, and arranged with reference to the bush B, substantially as described, and for the purposes specified.

5. The chamber formed by the end of valve C, the end of bush B, and cap D, substantially as described, and for the purpose specified.

6. The metallic adjusting-rod $a$, Fig. 3, arranged to hold a plug-valve in its seat and adjust it by the expansion and contraction of the rod, to prevent the valve being damaged.

SIDNEY MALTBY.
BARTON PICKERING.

Witnesses:
WM. MITCHELL,
THOS. D. MITCHELL.